Sept. 19, 1950 G. T. HEMMETER 2,522,513
APPARATUS FOR BLANCHING DEEP BEDS OF VEGETABLES
Filed Nov. 1, 1944 5 Sheets-Sheet 1
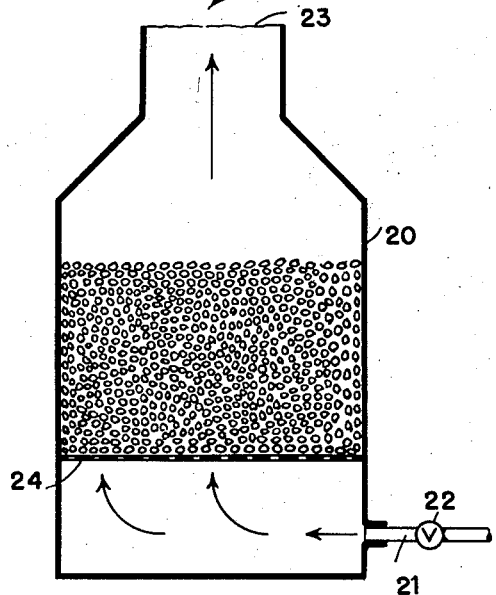
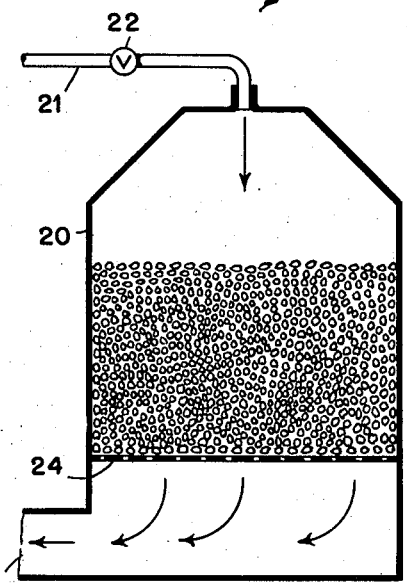
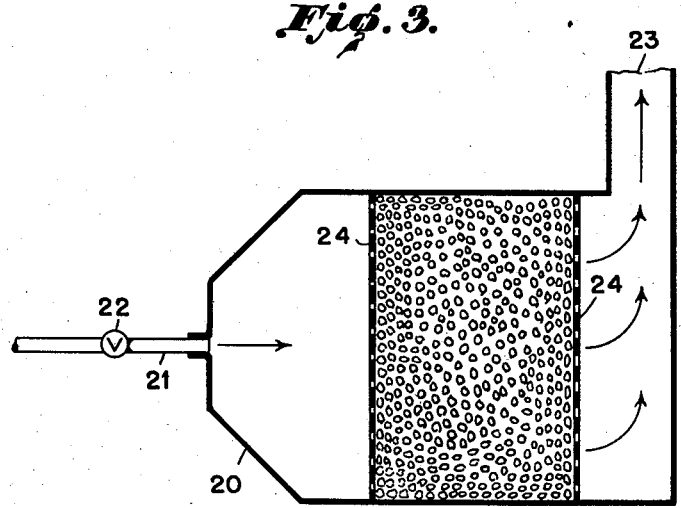
Inventor
G. T. HEMMETER
By H. A. Foss.
C. L. Richards
Attorney

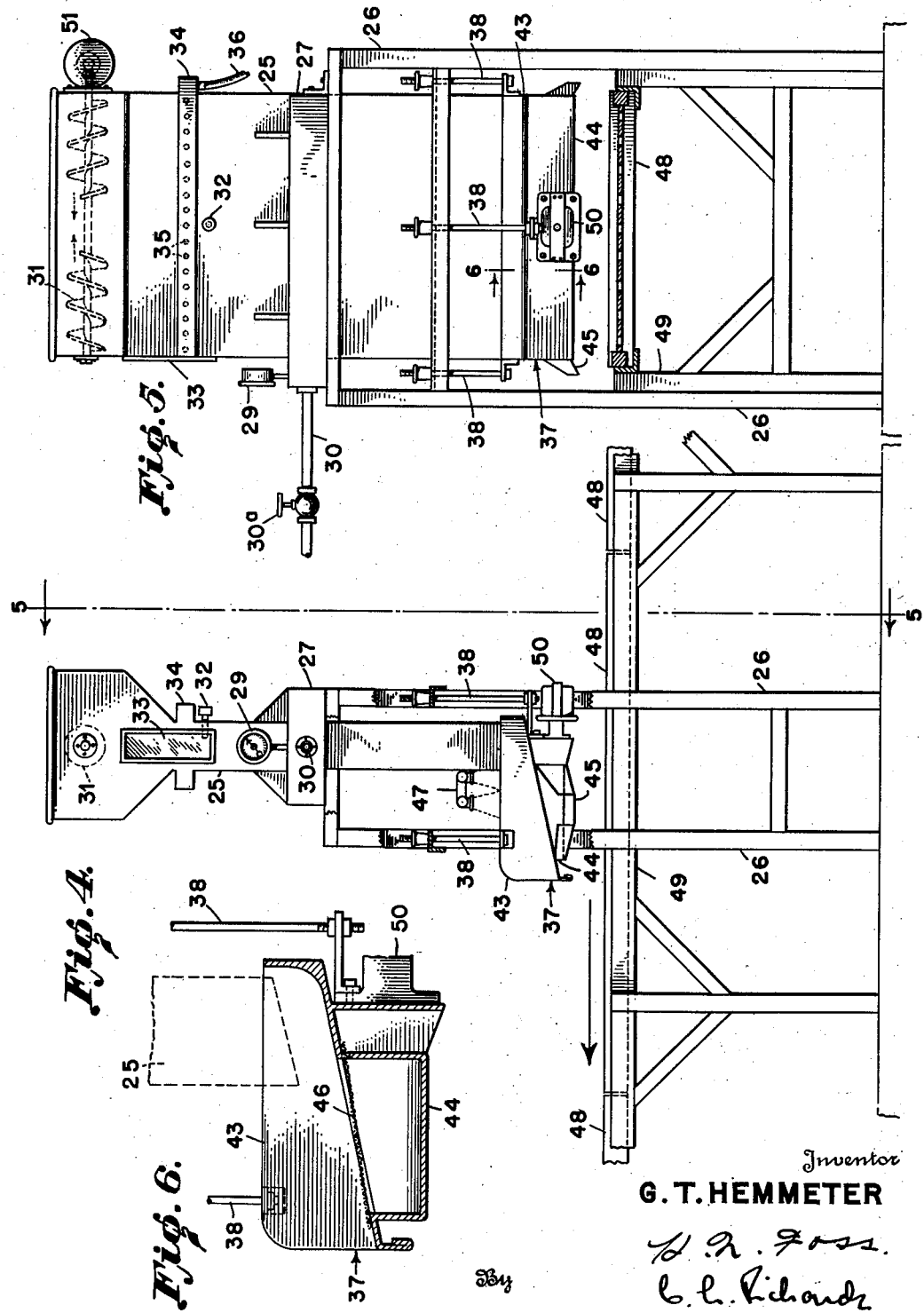

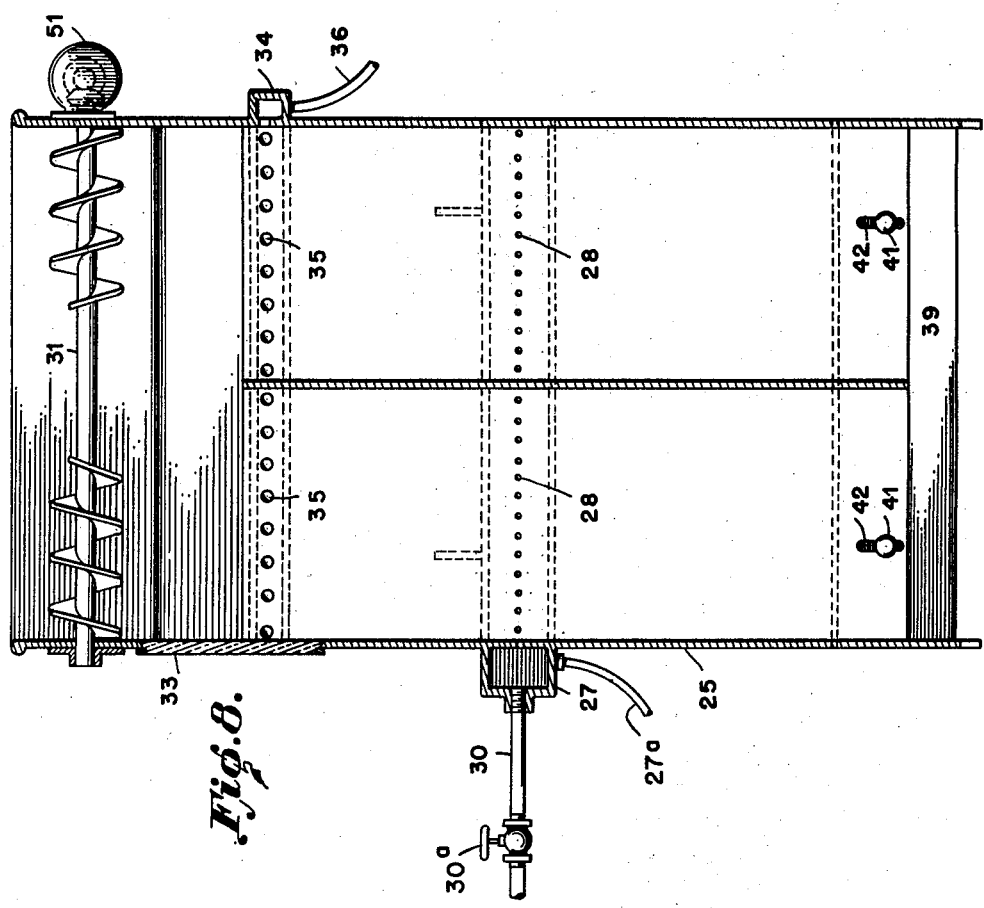
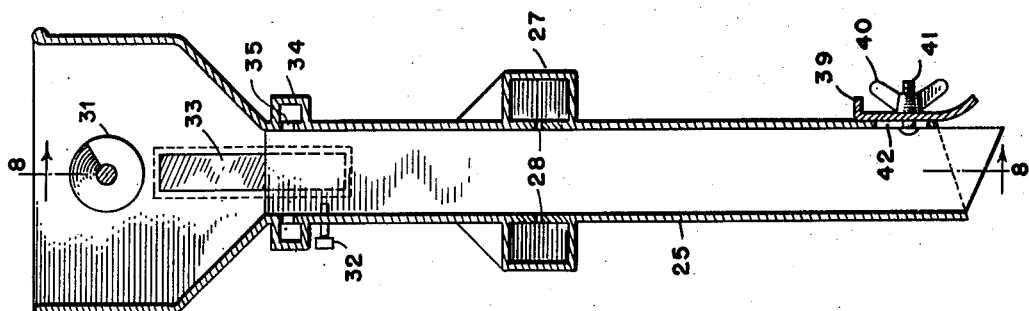

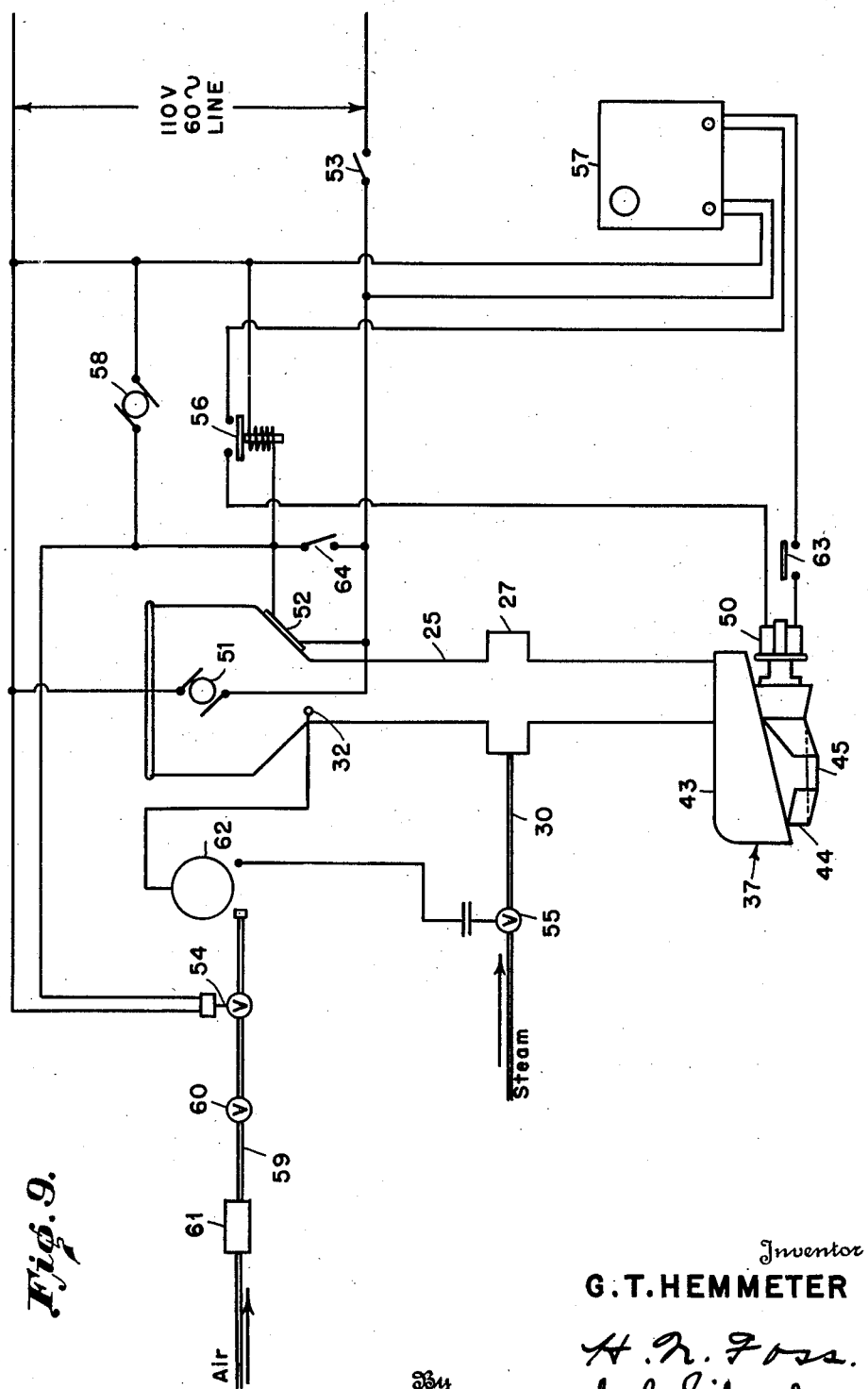

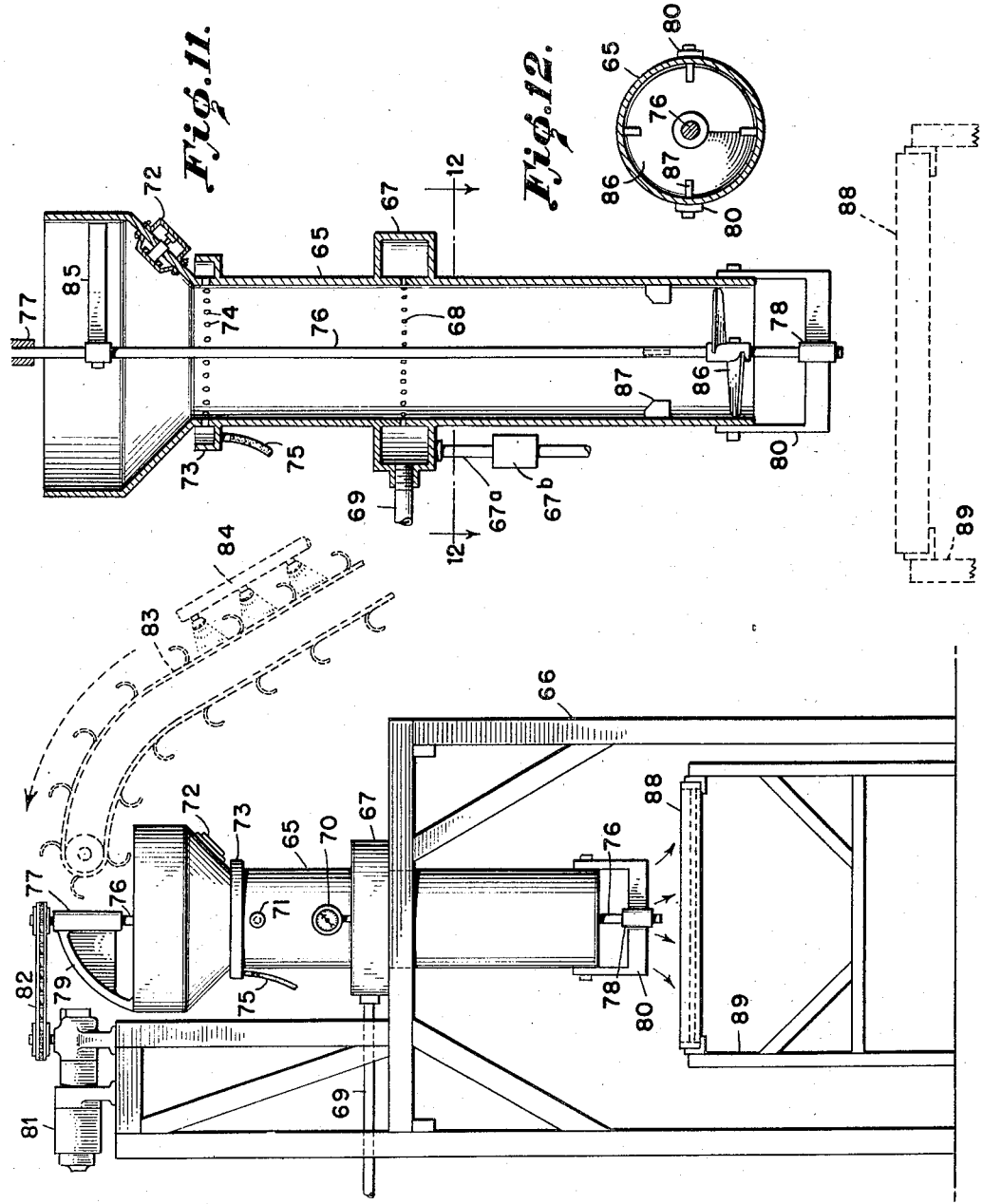

Patented Sept. 19, 1950

2,522,513

UNITED STATES PATENT OFFICE 2,522,513

APPARATUS FOR BLANCHING DEEP BEDS OF VEGETABLES

George T. Hemmeter, Berkeley, Calif., assignor to United States of America as represented by the Secretary of Agriculture Application November 1, 1944, Serial No. 561,462

5 Claims. (Cl. 99—443)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to apparatus for blanching vegetables, and has among its objects the provision of means for facilitating such operations.

Vegetable blanching as conducted by existing practical methods requires the use of relatively large apparatus for carrying out the process. The most common method employed commercially consists of spreading a thin layer of the material to be blanched on trays or a moving belt, and then exposing the material to steam at atmospheric pressure. The outer layer of the material thus exposed to the steam is heated directly, while the inner portions of the bed are heated by conduction of the heat through the material. This circumstance severely limits the depth to which the trays or moving belt may be loaded, a loading depth of ¾ inch being the usual practical limit. As a result, blanching equipment is characteristically large and bulky.

According to the present invention, the size limitations and the inherently poor heat distribution characteristics of the blanching equipment heretofore in use are substantially eliminated. I have found that means may be provided whereby thick beds of vegetables can be blanched rapidly and uniformly in relatively compact equipment.

My invention is illustrated in the accompanying drawing, forming a part of this specification, in which:

Figures 1, 2 and 3 are schematic representations of basic embodiments of my invention;

Figure 4 is a side elevation of an embodiment of my invention adapted for continuous operation;

Figure 5 is a corresponding end view on the line 5—5 of Figure 4;

Figure 6 is a detail of the shaker mechanism on the line 6—6 of Figure 5;

Figure 7 is a vertical transverse section of the blanching chamber;

Figure 8 is a corresponding longitudinal section on the line 8—8 of Figure 7;

Figure 9 is a schematic wiring diagram for suitable automatic control of a blancher constructed according to my invention;

Figure 10 is a side elevation of a further embodiment of my invention adapted for continuous operation;

Figure 11 is a corresponding vertical section; and

Figure 12 is a section on the line 12—12 of Figure 11.

Referring now more particularly to the several views shown in the drawing, my invention may first be described most readily in relation to Figures 1, 2 and 3 which illustrate basic embodiments. As illustrated, my blancher comprises a steam chest 20 to which steam may be fed under pressure through a pipe 21 fitted with a control valve 22, and which has a discharge opening 23 to the atmosphere. Positioned between the points at which steam is supplied through the pipe 21 and the discharge opening 23 is located the steam chest 20 which is provided with a perforated plate, wire screen, or other reticulated partition 24 for containing and supporting the bed of vegetables during the blanching operation.

When steam is supplied under slight pressure to a blancher of this type loaded with a relatively thick bed of vegetables, heat is carried to the inner-bed material directly by the steam rather than indirectly by conduction from the outer surfaces. The steam also sweeps and scavenges all residual and liberated air from the vegetable bed, thus removing an effective insulating medium which would otherwise impede the rapid and uniform flow of heat to the vegetables.

Substantial variations in depth of bed may be accommodated by varying the steam pressure in accordance with the increased flow resistance as the depth of bed increases. Actual tests have shown that beds of ⅜" x ⅜" x ⅜" diced potatoes 18" thick are penetrated by steam at 11 inches water gauge pressure above atmospheric in approximately 35 seconds in equipment constructed according to my invention. The blanching carried out under these conditions was thorough and uniform, and effective operation with beds substantially deeper than 18" was indicated.

Because the flow of steam, and hence the flow of heat, through the bed of vegetables is rapid and positive, air is quickly driven from the bed and the vegetables are rapidly and uniformly heated by the steam. Also, because the rate of flow is adjustable by varying the steam pressure within reasonable limits, the difference in the effective heating of the upper and lower surfaces of the beds can be adjusted well within acceptable limits. I have found that it makes substantially no difference whether the steam is forced to flow up, down or crosswise through the vegetables. Figures 1, 2 and 3 illustrate arrangements for each of these possibilities.

My invention may also be adapted for continuous operation. One arrangement for accomplishing this result is illustrated in Figures 4 to 8, inclusive. According to this embodiment, a blanching chamber 25 having a rectangular cross-section and formed in hopper fashion at its upper end, is supported in a vertical position, or if desired, in an inclined position, on a framework 26. Steam is supplied to the blanching chamber 25 through a steam manifold 27 fitted about midway of its length over orifice or openings 28 in the chamber walls, the steam manifold 27 being otherwise provided with a pressure gauge 29 and a steam supply line 30 which may, as previously described, be controlled by a valve or other controlling means.

At the upper end of the blanching chamber 25, the previously mentioned hopper portion is equipped with a longitudinal, double-action screw distributor 31, pitched from each end toward the center and terminating on each side before the center is reached; a temperature-sensitive control unit 32 for automatically controlling the steam supply; an observation window 33 comprising a heat-resistant glass panel; and a drain manifold 34 arranged at the throat of the hopper portion, fed through perforations 35 in the chamber walls, and drained by a discharge conduit 36.

A shaker mechanism 37 supported independently by support rod assemblies 38 on the framework 26 is positioned at the lower end of the blanching chamber 25 to receive and dispense material discharged from the chamber 25 after blanching. Placed to cooperate with the shaker mechanism 37 is an adjustable gate 39 attached to the front wall of the chamber 25 by wing nuts 40 engaging bolts 41 fitting in vertically elongated slots 42. The gate 39 allows the effective discharge opening from the blanching chamber 25 to be readily accommodated to the nature of the material being blanched. The shaker mechanism 37 comprises a discharge pan 43 having the major portion of its bottom recessed to form a drain pan 44 terminating at each end in drain lips 45, the contour of the bottom of the discharge pan 43 being maintained by wire mesh 46, or the like, fitted over the recess. Water sprays 47 are arranged to play on the wire mesh 46. The discharge pan 43 is inclined suitably for dispensing the blanched material onto drying trays 48 supported on a loading table 49. A conveyor belt system might of course be used equally well in place of the drying trays and loading table.

Operation of a blancher of the type just described proceeds as follows: The blanching chamber 25 is completely filled with vegetables to be blanched, and then steam is caused to flow into the manifold 27 under pressure. The steam thus supplied enters the chamber 25 through the perforations 28 and, being under pressure, it is forced to flow through the material in the chamber 25 toward both ends, thereby heating the material and performing the blanching function. The rate of steam flow through the blanching chamber 25 may be controlled by adjusting the steam pressure in the manifold 27, and the chamber 25 may be designed and the steam manifold 27 located according to well-known principles so that substantially equal steam flow to each end of the chamber 25 is obtained and loss of steam at the ends is negligible. Having properly treated the initial charge, the feed and discharge means are then started. The shaker mechanism 37 which dispenses the blanched material from the chamber 25 is actuated by an electric vibrating feeder 50 mounted on the discharge pan 43. An adjustable amplitude pulsating electric Syntron vibrating feeder having a rated input of 150 to 200 watts has been found quite satisfactory for dispensing 1500 lbs. per hour of blanched diced products. When the vibrator 50 is started, it vibrates the discharge pan 43 so that the blanched material is metered from the chamber 25. As the material passes over the wire mesh 46 in the discharge pan 43, it may be subjected to the chilling treatment by water from the sprays 47 which drains down to the drain pan 44 and off through the drain lips 45. The blanched material is then dispensed from the discharge pan 43 into the drying trays 48 which are supported and brought successively into proper position on the loading table 49. After the blanched material is thus disposed in the drying trays 48, it is ready for further treatment or processing according to usual commercial practice.

New material to be blanched is added at the upper end of the blanching chamber 25 at the same average rate as material is removed from the bottom. The added material is distributed evenly by the screw distributor 31 which is geared to an electric motor 51, suitably a ½ H. P. motorized speed reducer having an output speed of approximately 50 R. P. M. With some materials, particularly diced potatoes, it is advantageous to drain the accumulated condensate from the top of the blanching chamber 25. Means for accomplishing this result is provided by the series of perforations 35 located at the throat of the hopper portion of the chamber 25 and communicating with the drain manifold 34 which is in turn drained by the discharge conduit 36.

By adjusting the rate of flow through the blancher, the retention time, and hence the blanching time, may be varied as desired. It is possible in fact to process the material until it is actually cooked if that result is desired. For normal blanching operations, the temperature-sensitive control unit 32 is set at some temperature above the room temperature but below the boiling point of water and the pressure in the steam manifold 27 is adjusted to supply steam at a rate more than equal to the average demand rate (about 2 to 6 inches water gauge). If the steam flow is to be adjusted manually, steam valve 30a should be set to give a slight excess of steam as evidenced by a small steam leakage at the top of the blancher during normal operation. When the blancher is properly adjusted, continuous blanching proceeds with great facility. Each particle of the material to be processed is effectively subjected to blanching treatment during its travel through the chamber 25, and is then deposited on the drying trays 48 with a minimum of handling. A blancher of the type just described is well suited for blanching diced root vegetables, as well as cut corn, peas, beans, or the like.

An arrangement for substantially complete automatic operation of a blancher such as has just been described is represented schematically in Figure 9. According to this arrangement, the controls are operated from a standard 110 volt, 60 cycle line. The major control unit is a pressure switch 52, which is normally in open position, but which has a pressure-sensitive surface exposed in the hopper portion of the blanching chamber 25 so that when the chamber 25 is sufficiently loaded the resulting pressure will close it. The previously described electric motor 51 which drives the screw distributor 31 is connected directly across the line so that it is available as soon as the line switch 53 is closed to distribute material which it is proposed to blanch evenly through the blanching chamber 25 as the material is added. When the added material reaches a level in the chamber 25 sufficient to cover the exposed pressure-sensitive surface of the switch 52, this switch also closes, and in turn supplies power to: (1) a solenoid air valve 54 which actuates the controls for a steam supply valve 55; (2) a relay 56 which energizes to connect the electric vibrator 50 mounted on the shaker assembly 37 on the line through a controller 57; and (3) an additional electric motor 58 for driving the loading table 49 adapted to carry the drying trays 48 along in conveyor fashion. The solenoid air valve 54 is arranged on an air line 59, which is also equipped with an auxiliary hand valve 60 and a filter 61, and which delivers air through the solenoid valve 54 to operate a temperature controller 62 regulating the steam supply valve 55. The temperature controller 62 is connected with the temperature-sensitive control unit 32 and is thus arranged to accommodate the steam supplied through the valve 55, which is of the modulating diaphragm type, to the temperature desired in the blanching chamber 25. The closing of the pressure switch, as stated, also starts the electric vibrator 50 and the loading table driving motor 58. As it is desirable to be able to control the vibrator 50 so that its action may be adjusted to the handling of a variety of materials, the controller 57 is provided for this purpose. The motor 58 may be of the variable speed type, or it may be selected to drive the loading table 49 at a satisfactory average speed. The operation of the loading table 49 may be coordinated with the action of the shaker mechanism 37 by connecting a trip switch 63 in the circuit to the vibrator 50. Such a switch can be arranged so that it will be tripped by the drying trays 48 as they come into position to receive material discharged from the shaker mechanism 37 and tripped again as they move on down to loading table 49, thus starting and stopping the vibrator 50 as a drying tray 48 is or is not presented to receive the discharge material. A further convenient feature is a by-pass switch 64 which may be closed to allow operation of the blancher independently of the function of the pressure switch 52. This arrangement provides a ready adjustment for manual control of the various operating units where particular circumstances render such control desirable, and enables the unit to be cleaved at the end of the run.

There are, of course, a variety of other arrangements which might be used to effect the automatic control just described, and it will also be recognized that a blancher operating according to my invention may be constructed in various ways. In illustration, a further embodiment of my invention is represented in Figures 9 to 12, inclusive. In this embodiment, a cylindrical blanching chamber 65 is used which, as before, is flared at its upper end to form a hopper portion. The blanching chamber 65 is again supported on suitable framework 66, and equipped with a steam manifold 67 about midway of its length fitted with a condensate drain 67a and a steam trap 67b fitting over perforations 68 in the chamber walls, fed by a steam supply line 69, and provided with a pressure gauge 70. Also, a temperature-sensitive control unit 71, a pressure switch 72, and a drain manifold 73, fed through perforations 74 in the walls of the chamber 65 and having a discharge conduit 75, are all arranged near the throat of the hopper portion of chamber 65 in the manner specified in relation to the embodiment previously described. The blanching chamber 65 is otherwise modified, however, by the provision of a centrally disposed vertical shaft 76 rotatably mounted in bearings 77 and 78 supported as shown by bearing brackets 79 and 80 at the upper and lower ends, respectively, of the chamber 65. The shaft 76 is driven by a motor unit 81, suitably a variable speed-reduction unit having an output speed of 5 to 20 R. P. M., mounted on an extension of the framework 66, and connected by a sprocket and chain drive 82 to the shaft 76. The material to be blanched is fed to the blanching chamber 65 by an elevator conveyor 83, which may be equipped with washing sprays 84. A feed distributor 85 is mounted to rotate with the shaft 76 inside the hopper portion of the chamber 65 so that the material introduced by the conveyor 83 is distributed evenly. The lower end of the chamber 65 is substantially closed by a single cycle feed screw 86, which is also mounted to rotate with the shaft 76. The feed screw 86 will accordingly support the material in the chamber 65 while it is being blanched, and when blanching is complete the material may be discharged from the chamber 65 by rotation of the feed screw 86. The discharge is accomplished by the usual feed screw action aided by fins 87 spaced on the inner wall of the chamber 65 to prevent the column of material in the chamber from turning when the feed screw 86 is rotated. Discharge from the chamber 65 is received by a drying tray 88 and loading table 89 arrangement, as previously described, which may be motor driven if desired.

A 50-ton blancher constructed in a manner similar to the blancher described above in illustrating my invention can be built for less than 10 percent of the cost of a comparable steam blancher of the atmospheric type, can be operated for about one-third the daily operating cost of an atmospheric-type blancher, and requires only approximately 1/75th as much floor space. Actual tests, however, have shown performance to be fully as effective as that obtained with the blanchers now commonly in use, while blanching time and handling required are substantially reduced.

Having thus described my invention, I claim:

1. A vegetable blancher of the type described comprising a blanching chamber in the form of a hollow column supported in substantially vertical position and open to the atmosphere at both ends, inlet means by which steam under pressure may be supplied to said chamber including a series of openings spaced about a horizontal cross section of said chamber about midway of its length and a manifold externally covering said openings, discharge means at the lower end of said chamber positioned to support material to be blanched in said chamber until actuated to discharge said material, means for actuating said discharge means, means for removing condensate from said chamber including a series of openings spaced around a horizontal cross section of said chamber near the upper end thereof and a trough about said openings.

2. A vegetable blancher of the type described comprising a blanching chamber in the form of a hollow cylinder supported in a substantially vertical position, open to the atmosphere at both ends, and flared at its upper end to form a hopper portion to receive material to be blanched in said chamber, inlet means by which steam under pressure may be supplied to said chamber including a series of openings spaced around a horizontal cross section of said chamber about midway of its length and a manifold externally covering said openings, a shaft positioned vertically within said chamber and provided with a blade near its upper end adapted to effect a substantially even distribution of material introduced into said chamber, a feed screw positioned on said shaft near its lower end adapted to discharge material from said chamber, means for rotating said shaft, means for removing condensate from said chamber including a series of openings spaced around a horizontal cross section of said chamber near the upper end thereof and a trough about said openings.

3. A vegetable blancher of the type described comprising a blanching chamber in the form of a hollow column supported in a substantially vertical position, open to the atmosphere at both ends, flared at its upper end to form a hopper portion to receive material to be blanched in said chamber, agitating means operable in the hopper portion of said chamber for effecting a substantially even distribution of material introduced into said chamber, means for operating said agitating means, inlet means by which steam under pressure may be applied to said chamber including a series of openings spaced around a horizontal cross section of said chamber about midway of its length and a manifold externally covering said openings, an inclined screen beneath the lower end of said chamber positioned to support material to be blanched in said chamber until vibrated to discharge said material, and means for vibrating said screen.

4. A vegetable blancher of the type described comprising a chamber in the form of a hollow column supported in a substantially vertical position, open to the atmosphere at both ends, and flared at its upper end to form a hopper portion to receive material to be blanched in said chamber, agitating means operable in the hopper portion of said chamber for effecting a substantially even distribution of material introduced into said chamber, means for operating said agitating means, inlet means by which steam under pressure may be supplied to said chamber including a series of openings spaced around a horizontal cross section of said chamber about midway of its length and a manifold externally covering said openings, an inclined screen beneath the lower end of said chamber positioned to support material to be blanched in said chamber until vibrated to discharge said material, means for vibrating said screen, and spray means for chilling blanched material disposed on said screen.

5. A vegetable blancher of the type described comprising a blanching chamber in the form of a hollow column supported in a substantially vertical position, open to the atmosphere at both ends, flared at its upper end to form a hopper portion to receive material to be blanched in said chamber, agitating means operable in the hopper portion of said chamber for effecting a substantially even distribution of material introduced into said chamber, means for operating said agitating means, inlet means by which steam under pressure may be supplied to said chamber including a series of openings spaced around a horizontal cross section of said chamber about midway of its length and a manifold externally covering said openings, an inclined screen beneath the lower end of said chamber positioned to support material to be blanched in said chamber until vibrated to discharge said material, means for vibrating said screen, means for removing condensate from said chamber including a series of openings spaced around a horizontal cross section of said chamber near the upper end thereof and a trough about said openings.

GEORGE T. HEMMETER.

REFERENCES CITED

The following references are of record in the file of this patent:

UNITED STATES PATENTS

| Number | Name | Date |
| --- | --- | --- |
| 576,226 | Raney | Feb. 2, 1897 |
| 911,408 | Jensen | Feb. 2, 1909 |
| 959,448 | Baxter | May 31, 1910 |
| 979,591 | Storm | Dec. 27, 1910 |
| 1,243,251 | Tidwell | Oct. 16, 1917 |
| 1,471,727 | Gomez | Oct. 23, 1923 |
| 2,083,293 | Champlin | June 8, 1937 |
| 2,213,623 | Choppin et al. | Sept. 3, 1940 |